United States Patent [19]

Alsobrook

[11] Patent Number: 4,540,133

[45] Date of Patent: Sep. 10, 1985

[54] TAPE REEL AND METHOD

[75] Inventor: Lawrence C. Alsobrook, Auburn, Ala.

[73] Assignee: Data Technology Corporation, Opelika, Ala.

[21] Appl. No.: 664,370

[22] Filed: Oct. 24, 1984

[51] Int. Cl.³ .............................................. B65H 75/18
[52] U.S. Cl. .................................. 242/71.8; 242/118.4
[58] Field of Search ...................... 242/71.8, 71.9, 116, 242/118.4, 118.7, 118.8

[56] References Cited

U.S. PATENT DOCUMENTS

| | | | |
|---|---|---|---|
| 4,044,965 | 8/1977 | Posso | 242/71.8 |
| 4,083,509 | 4/1978 | Vasudeva et al. | 242/71.8 |
| 4,088,278 | 5/1978 | Adair | 242/71.8 |
| 4,327,879 | 5/1982 | Tanny | 242/71.8 |

Primary Examiner—Leonard D. Christian
Attorney, Agent, or Firm—Cort Flint

[57] ABSTRACT

A magnetic tape reel (10) is illustrated which includes a central hub (A) and a back flange (B) and a front flange (C). The central hub (A) is symmetrical about a plane represented by line (26) which is normal to the reel axis (28) passing through the axial center of the reel. Through a section of the central hub there is provided a compression resisting Y-shaped section (D) that includes a transversely widened web stem (44) which carries an enlarged compression-resisting body at the top thereof which carries the tape winding ring (12). The compression-resisting body includes a shoulder (46) and a Y-shaped crossarm (48). Winding of tape on the tape winding ring (12) causes compression forces which are effectively resisted by the structure afforded through the Y-shaped web section (D). Attachment between the back flange (B) and the central hub is had between a ledge supporting surface (78) and a side of the shoulder (46b). Attachment is also had between fingers (84) which penetrate into web recess spaces (18) formed at the web (W). Attachment between the front flange (C) and the central hub (A) is had at a supporting ledge surface (50) and a side (46c) of the shoulder (46) and between cleats (58) carried on the end of a base surface (56) and the spindle mounting ring (14).

39 Claims, 6 Drawing Figures

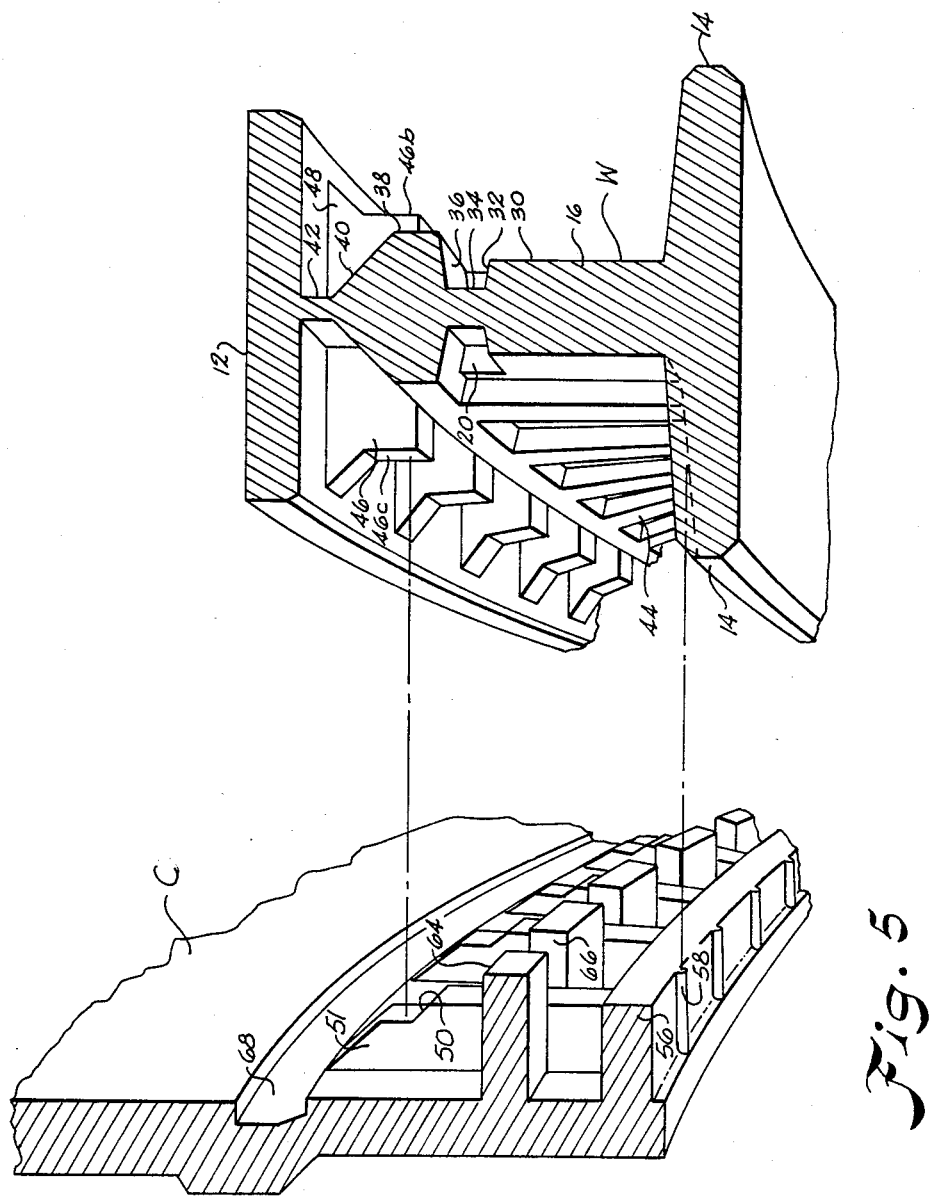

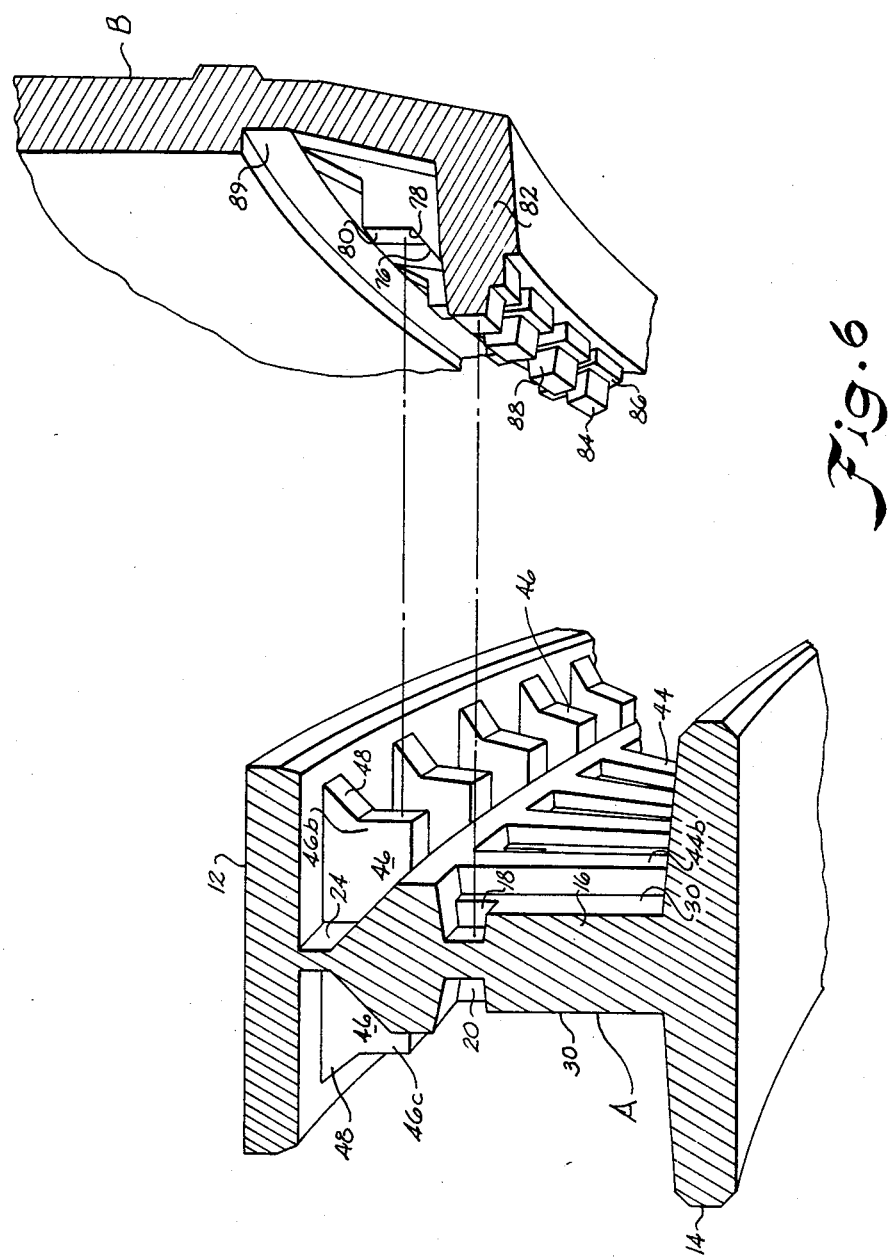

TAPE REEL AND METHOD

BACKGROUND OF THE INVENTION

The invention relates to a tape reel on which is wound magnetic tape of the kind which is typically used in the computer industry. With the increasing speed of present day computers, the need for increasing the amount of information stored on a computer tape reel has increased proportionately. To obtain more information on a computer reel, thinner magnetic tapes which are wound more tightly on the reel have been proposed and utilized. To increase the amount of tape wound on the tape reel, the tape has in essence been compressed more tightly on the tape reel. This has resulted in increased compressive loading on the central hub of the reel which includes the tape winding ring about which the tape is wound.

Prior magnetic tape reels which were used to wind magnetic tapes at normal tensions have been found not entirely suitable for the increased tape densities and tensions. Two of the main problems are structural failure of the central winding hub and flaring in or out of the outer edges of the reel flanges which are attached to the central hub. In prior tape reels, the larger compressive forces encountered by increased tape density and winding tensions have caused the edges of the reel flanges at their outer diameters to deform slightly in or out which causes uneven winding of the tape on the reel. Even slight deformation of this nature can cause the tape to wind in a conical manner bearing more or less against one of the flanges instead of being squarely wound on the hub. This conical winding tends to impart stresses to the flange which can cause it to fracture from the hub and possibly result in destruction of the tape being wound on the tape reel.

Numerous proposals have been made in order to strengthen the tape reel, and in particular the central hub, for accommodating the larger tape densities and winding tensions. For example, in U.S. Pat. No. 4,044,965, a box-like structure is provided by four annular continuous cylindrical welding surfaces between the reel flanges and the central hub. The box-like structure is said to effectively accommodate the increased compressive forces by transmitting the force from the tape winding ring, through the sides of the box which are formed through ribs on the flanges, to the spindle mounting ring of the tape reel. It is said that this box structure is sufficiently rigid and undeformable to avoid the hub tightening on its driving spindle, the flanges buckling, and the ring losing its cylindricity, while the tape is being wound. While the four annular welding surfaces are continuous about the mating surfaces of the reel flanges and the central hub, U.S. Pat. No. 4,327,879, has sought to accomplish the box-like strcuture by utilizing non-continuous welding surfaces. In U.S. Pat. No. 4,327,879, it was thought that the reel of U.S. Pat. No. 4,044,965, suffered the primary disadvantages of not being able to maintain consistent welding throughout the circumference of the reel. This is due to part-to-part irregularities and flange-to-hub misalignments which would prevent full circumferential contact between the annular collars of the central hub and the welding surfaces of the side reel flanges. The continuous annular contact is thought to be unattainable due to these part inconsistencies and processing misalignments which could result in inconsistent weld areas and resulting part rejection. In U.S. Pat. No. 4,327,879, the thought of using spokes extending radially outward from the tape winding ring and the tape winding hub was proposed wherein the spokes were spaced circumferentially around the central hub. Corresponding mating surfaces of the tape reel flanges, also provided in a noncontinuous manner around the circumference of the parts, were then made to align with the spokes on the central hub. Box-like structures where provided at the sections where the central hub and the side flanges were made to contact one another. The teaching of U.S. Pat. No. 4,327,879 then is that the continuous welding surfaces which provide a box-like structure in U.S. Pat. No. 4,044,965 were not necessary and that only point contact welding surfaces are needed at circumferential intervals around the reel.

Other proposals are found in U.S. Pat. Nos. 4,083,509 and 4,088,278 which are very similar. The general concept in these two patents is that the reel flanges are not connected to the spindle mounting ring of the central hub, but rather are attached and welded between the tape winding ring and an intermediate ring. In one sense, these two patents merely shorten the box-like structure which was sought to be obtained in the aforesaid two patents. This is accomplished by moving the lower attachment points of the flanges from the sprindle mounting ring radially outwardly to an intermediate ring. In U.S. Pat. No. 4,083,509 the side flanges are attached underneath or to the radially inward side of the intermediate ring. In U.S. Pat. No. 4,088,278 the side flanges are attached to the radially outward side of the intermediate ring.

Generally speaking, the gist of the four patents described above, has been to provide a box-like or other structure for reinforcing the tape reel against compressive loading. The structures provided have attempted to take the compressive forces from the tape winding ring, transmit them through a rib or other structure of the side flanges, and then transmit them through the side flanges to the spindle mounting ring or intermediate ring of the central part. The box-like structure offers a high resistance to compression produced by the tape being wound on the reel. The problems encountered by these approaches are that when the reel flanges are used in such a manner to provide components of the box-like or other structure which resists compression, it is inevitable that some influence is made on the reel flanges or some slight deformation regardless of the strength of the box-like structure.

As recognized in U.S. Pat. No. 4,083,509 other problems are caused by the asymmetrical nature of the forces produced by the asymmetrical designs of the central hubs of some of the prior patents. The teachings of U.S. Pat. No. 4,083,509 is to design the central hub so that its parts are offset with respect to each other so that the forces which resists deformation are generally equally distributed on opposite sides of the plane normal to the reel axis passing through the axial center of the reel. Symmetrical force distribution then is taught by having an asymmetrical hub design which compensates for the different structures and force loadings of the front and back reel flanges. In so doing, however, the assembly process of the reel is made complicated due to the asymmetrical hub design and fitting of the parts together to such an assymetical configuration.

Accordingly, an important object of the present invention is to provide a magnetic reel which accommodates the increased tape density and tape winding tensions utilized in present day high-speed computers without any appreciable deformation of the reel parts.

Still another important part of the present invention is to provide a magnetic tape reel wherein the forces of compressive loading of the tape being wound on the reel are transmitted mainly through the central hub part itself and not the reel flanges.

Still another important object of the present invention is to provide a tape reel having a symmetrical central hub making it easy to manufacture and assemble with the side flanges.

Still another important object of the present invention is to provide a magnetic tape reel having a central hub which is symmetrical about a plane normal the reel axis passing through the axial center of the reel such that the forces of compressive loading placed on the central hub are transmitted symmetrically through the central hub on either side of the normal plane.

Still another important object of the present invention is to provide a tape reel for accommodating increased tape densities and winding tensions which includes a central hub having a number of circumferentially spaced transverse "Y" shaped web sections which resist the forces produced by compressive loading while the tape is being wound on the reel.

SUMMARY OF THE INVENTION

The above objectives are accomplished according to the present invention by providing a central annular hub which includes a tape winding ring and a inner spindle mounting ring. Connected between the tape mounting ring on which the tape is wound and the spindle mounting ring is a web. A plurality of circumferentially spaced transverse Y-shaped web sections are included in the annular hub which extend between between the tape winding ring and the spindle mounting ring. The Y-shaped web section is widened relative to the web section that extends between the Y-shaped sections. Each Y-shaped section includes a transversely widened stem portion and an enlarged crossarm portion which resists compression and is carried atop the stem. A shoulder is include in the enlarged Y-shaped crossarm portion which is attached to a complimentary ledge supporting surface formed inwardly on the front and back reel flanges. The central hub is symmetrical about a plane normal to the reel axis passing through the axial center of the mounting ring. There is a compression absorbing space defined between the crossarm of the Y-shaped web section and the supporting ledges of the front and back flanges which accommodates any flexure of the crossarm due to compressive loading. There is a sufficient space such that movement of the flanges and distortion of the flanges is unlikely due to movement of the crossarm. Recesses formed in the web between the transverse Y-shaped web sections serve to align the back flange and a slotted rim surface is utilized to align the front flange. Since the central hub is symmetrical, alignment problems are avoided and either the back flange or the front flange may be attached to either side of the central hub. The central hub advantageously accommodates compressive loading by distributing forces symmetrically through the hub with essentially little or no forces transmitted through the side flanges of the reel.

DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 5 is an enlarged perspective view of the mating parts of the front reel flange and the central annular hub; and FIG. 6 is an enlarged perspective view illustrating the mating parts of the back reel flange and the central annular hub.

DESCRIPTION OF A PREFERRED EMBODIMENT

The invention will now be described in more detail as relates to the construction of a magnetic tape reel upon which magnetic tape for computers and the like is wound.

Figure 1:
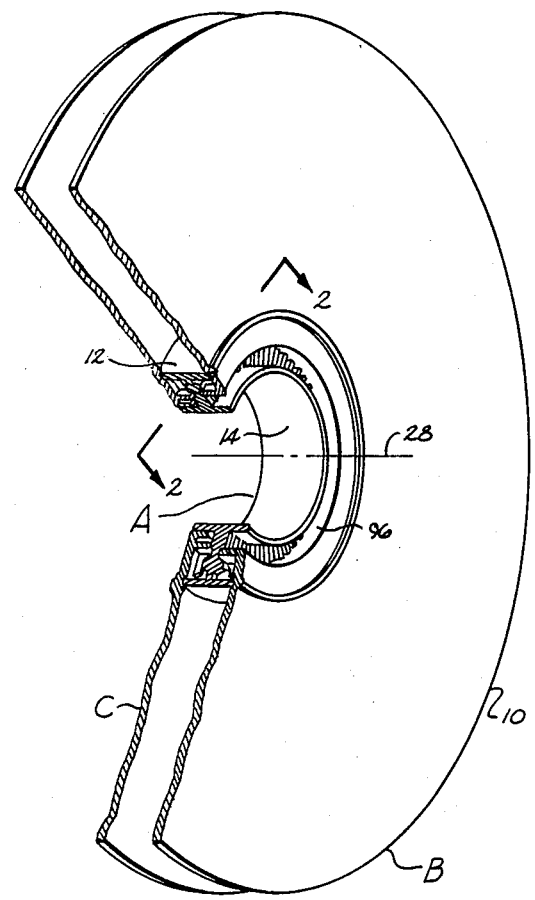
FIG. 1 is a perspective view of a magnetic tape reel constructed according to the present invention.

Referring now to FIG. 1, a magnetic tape reel 10 is illustrated which includes a central annular hub A to which a back flange B and a front flange C are attached. The central hub A includes a tape winding ring 12 on which the magnetic tape is wound and a spindle mounting ring 14 which is adapted to fit on a spindle drive of the computer.

Figure 3:
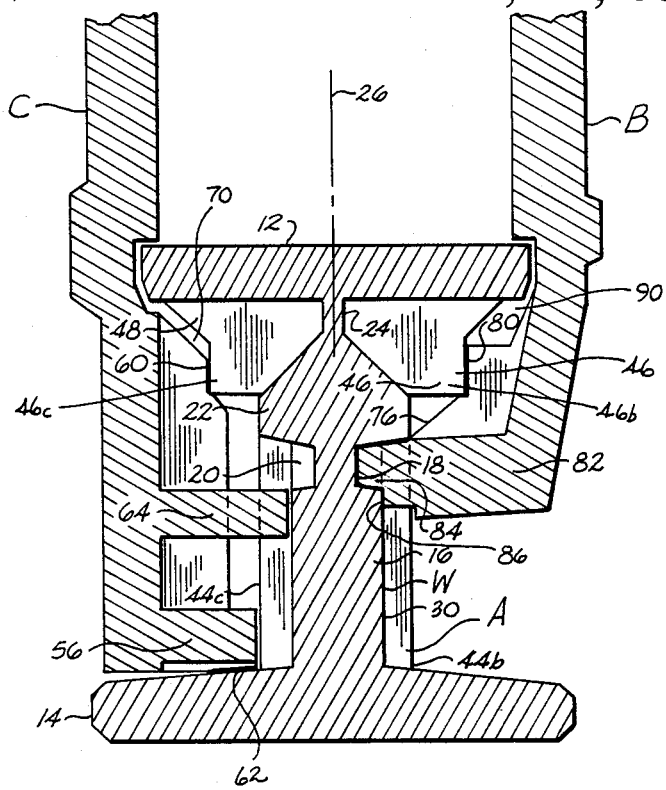
FIG. 3 is a sectional view taken along line 3—3 of FIG. 2.
Figure 4:
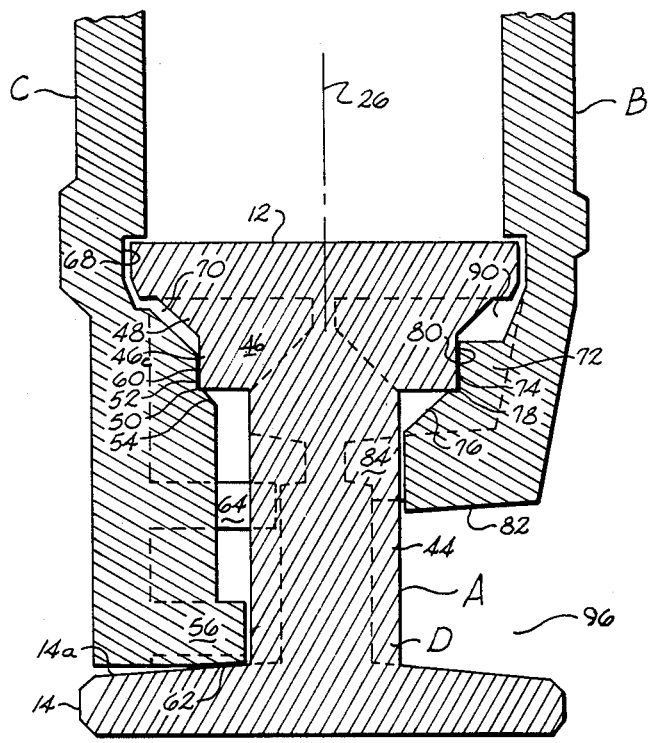
FIG. 4 is a sectional view taken along line 4—4 of FIG. 2.

Referring now in more detail to the annular central hub A of the tape reel, as can best be seen in FIGS. 3 and 4, the central hub A includes a web W which extends between the mounting ring 14 and the tape winding ring 12. The web W includes a straight section 16 which has a plurality of web recesses 18 and 20 formed on opposing sides of the web. The section 16 terminates at an interconnecting rim 22 and a thin web 24 connects the rim 22 to the tape ring 12.

The central hub A is symmetrical about a plane, represented by central line 26, as can best be seen in FIGS. 3 and 4, which is normal to the central axis 28 of the reel. The central hub A is a mirror image of itself about the plane or axis 26. Each image of the central hub includes a vertical or straight surface 30 which extends from the mounting ring 14 to a first recessed forming surface 32. The surface 32 terminates at a rear recessed forming surface 34 which extends to a bottom rim surface 36. The rim surface extends outwardly to a vertical surface 38 which terminates in an inclined rim surface 40. The surface 40 terminates at the thin web surface 42 which then terminates at the tape winding ring 12. These surfaces are identical on the reverse image side of the web.

Referring now in more detail to FIG. 4, a section of the central annular hub is illustrated which includes a transverse Y-shaped web section D. The Y-shaped section D includes a stem portion 44 which is widened and extends transverse to the web W. The stem is a transverse widened extension of web W. The stem 44 extends upwardly and terminates at a shoulder portion 46 which extends across the web W and has sides 46b and 46c. The shoulder portion forms part of and carries a Y-shaped crossarm portion 48 upon which the tape ring 12 is carried. The shoulder 46 and crossarm support 48 form a large-mass compression-resisting and absorbing body which supports tape ring 12 and is connected to the mounting ring 14 by the windened stem portion 44. This is the main supporting structure for resisting compression due to the tension of the magnetic tape being wound on the tape ring 12.

The front flange C is attached to the central hub by an inwardly projected ledge supporting surface 50 which includes a vertical wall 52 and an inclined wall 54. At the junction of the vertical wall 52 and the inclined wall 54, a supporting ledge is formed for the side of the shoulder 46c attached to the front flange C. Next, a second attachment is had at a base surface 56 projecting inwardly of the front flange C. The base surface 56 includes a number of individual cleats 58 on a bottom surface thereof. The cleats 58 engage a top surface 14a of the spindle mounting ring 14. It is at the areas of attachment at the vertical wall 52 and shoulder 46, and the abutment of the cleats 58 and top surface 14a of the mounting ring, that weldment occurs between the parts during assembly. The areas of weldment are shown in the darkened lines and, preferably, ultrasonic welding is utilized wherein the parts are made from a suitable plastic material such as polystyrene. The two weldment areas for the front flange are therefore illustrated at 60 and 62.

The front flange C also includes a number of intermediate inwardly projecting legs 64 which are spaced on opposite sides of the projection 51 on which the supporting ledge surfaces 50 are formed. In this manner, the legs 64 include a slot 66 therebetween. The legs 64 straddle the stems 44 of the Y-shaped web sections to properly align the shoulders 46 and the supporting ledges 50 with one another for attachment and weldment. A recessed groove 68 is provided in the front flange for receiving the end of the tape ring 12 in such a manner that a space and free movement is provided therein. There is also a flexure space 70 formed between the crossarm 48 and the top of the ledge surface 50 which accommodates movement of the tape ring 12 under very large compressive forces.

Figure 2:
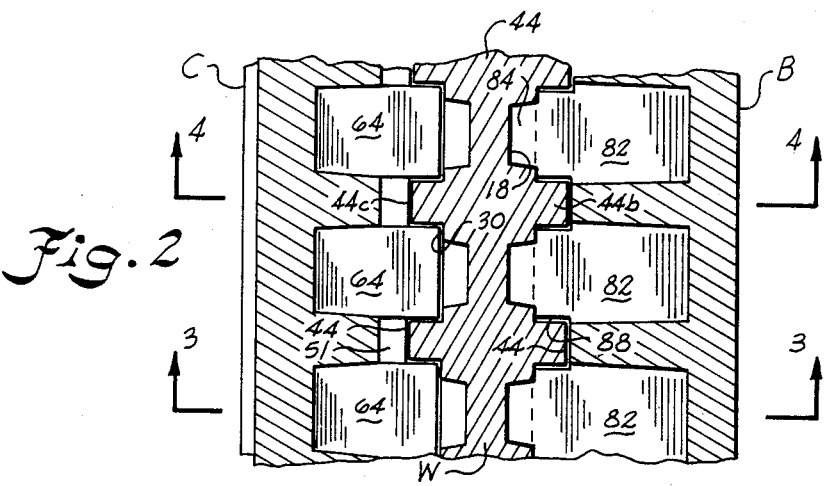
FIG. 2 is a sectional view taken along line 2—2 of FIG. 1.

Referring now to the attachment between the back flange B and the central hub A, as can best be seen in FIGS. 3, 4 and 6, there is a first attachment at a projection 72 which forms a ledge supporting surface for the back flange B. The projection 72 includes a vertical surface 74 and an inclined surface 76 at the junction of which is formed a supporting ledge 78 for the side 46b of the shoulder 46. Weldment occurs at the darkened area at 80 between these two parts. There is a second attachment by a lower inwardly projecting surface which includes a number of arms 82 formed at the end of the back flange B which terminate in reduced finger portions 84 which penetrate the recesses 18 formed on that side of the web W of the central hub. There is an abutment surface 86 on each arm which abuts against the flat surface of the web W surrounding the recess 18. In this manner, the back flange is properly aligned on the central hub A and therefore has a second attachment surface provided by the engagement of the arms 84 in the recesses 18. As can best be seen in FIGS. 2 and 3, there is weldment between the lower arm 84 and the recessed area 18 of the web in the darkened areas. The arms are slotted at 88 so that they straddle the Y-shaped web sections 44. There is no weldment between the back flange and the sides 44b of the stems 44 of the Y-shaped web section as can best be seen in FIG. 2. Likewise, there is no contact between the vertical surfaces of the projections 51 and the other side 44c of the stem sections 44, as can best be seen in FIG. 2, and there is no weldment in these areas. Nor is there intended to be any weldment between the ends of the intermediate projecting legs 64 and the surface 30 of the web W (see FIG. 2). The alignment of front flange C on hub A, may cause one side of the legs 64 to touch the sides of stem 44, without welding. Of the back blange B the fingers 84 will be solidly welded in the recess spaces 18, and for this reason a tight fit is provided so that weldment occurs at the darkened areas illustrated in FIG. 2. The only other point of weldment and attachment will be between the shoulders 46 and the supporting ledges 78.

There is a back flange groove 89 which receives the edge of the tape winding ring 12 and provides a clearance space so that tape ring may be moved if it comes under severe compressive forces. Likewise, a flexure space 90 is provided between the crossarm of the Y-shaped section and the ledge projection 72 of the back flange to accommodate any movement of the tape ring under compressive forces.

Thus, it can be seen by the above description of the attachment of the back and front side flanges to the central hub at the Y-shaped section thereof that the compressive forces are effectively transmitted symmetrically through the Y-shaped section of the hub and little or no forces are transmitted actually to or through the front flanges. In the case of the back flange B, the attachment of the back flange to the central hub provides for little or no resistance to compressive forces. Thus, no deflection or distortion of the back flange will occur. In the case of the front flange C there is a possibility that the attachment of the front flange between the mounting ring at 62 and the shoulder at 60 will affored a minor amount of resistance to compressive forces. However, it is not believed that this structural connection will provide enough resistance to compressive forces as to distort or deflect the front flange sufficiently enough to cause problems.

The major resistance to the compressive forces will be through the large-mass compression-absorbing body provided by the crossarm support 48 and shoulder 46. The forces will be symmetrically distributed through the central hub on either side of the central plane 26 due to the symmetrical nature of the central hub and the Y-shaped web section D of the central hub.

While the recess space 20 on the side of the front flange will not be utilized, the recess space is still present to provide a symmetrical shape to the central hub. Not only is the result of symmetrical distribution of compressive forces provided by this arrangement, but ease of assembly is provided since either flange may be attached to either side of the central hub. No care need be taken of which side is up when the flanges are attached to the central hub.

The interconnecting rim 22 interconnects the stem 44 and the shoulder 46 of the Y-shaped web sections, and also interconnects adjacent ones of the Y-shaped sections circumferentially spaced around the central hub. This affords some circumferential distribution of the compressive forces around the angular hub and serves to strengthen the hub against compressive forces.

A lockout ring groove 96 is provided between the mounting ring 14, the stem 44, and the bottom of arm 82 of the back flange. This lockout ring groove is the standard groove provided for a recording lockout ring.

While a preferred embodiment of the invention has been described using specific terms, such description is for illustrative purposes only, and it is to be understood that changes and variations may be made without departing from the spirit or scope of the following claims.

What is claimed is:

1. A magnetic tape reel comprising:
 a central annular hub;
 a tape winding ring carried by said hub on which said magnetic tape is wound;
 a spindle mounting ring carried by said hub adapted for mounting said reel to a spindle of an associated machine;
 a web extending between said mounting ring and said winding ring;
 a support shoulder extending across said web defining opposing shoulder sides on opposing sides of said web;
 a generally Y-shaped crossarm carried by said shoulder for supporting said tape ring on said hub;
 a widened web extension extending laterally beyond said web and tranverse thereto, and said web extension extending vertically between said mounting ring and said shoulder;
 a plurality of web recesses formed in said web around a circumference of said cental hub;
 a back flange carried by said hub;
 a front flange carried by said hub at a side thereof opposite said back flange;
 said back flange including a ledge surface for receiving one side of said shoulder of said hub;
 said back flange including web recess engaging means carried below said ledge surface for engaging said recesses of said web;
 said front flange including a ledge surface for receiving an opposing side of said shoulder of said hub; and
 said front flange further including a lower mounting base surface abutting said mounting ring of said hub for attachment.

2. The apparatus of claim 1 wherein said central annular hub is one-piece and is symmetrical about a plane normal to the reel axis which passes through the axial center of the reel.

3. The apparatus of claim 1 wherein said ledge surface of said front flange and said back flange includes a vertical wall surface and an inclined wall surface extending away from said vertical wall surface, said shoulder resting at the junction of said vertical and inclined surfaces.

4. The apparatus of claim 1 wherein said web recesses are formed on opposing sides of said web and include a rear recess wall limiting the depth of said recesses to less than the thickness of said web.

5. The apparatus of claim 1 wherein said web recess engaging means includes a plurality of web recess engaging arms having fingers which penetrate into the recesses of said web.

6. The apparatus of claim 1 wherein said shoulder and Y-shaped crossarm form a large mass body which absorbs compression from said tape winding ring, said Y-shaped crossarms including inclined arm portions extending outwardly from said shoulder on opposing sides of said web being inclined to a vertical of surface of said shoulders and terminating outwardly at said tape winding ring.

7. The apparatus of claim 1 including a flexure space between said Y-shaped crossarms of said central hub and said ledge surface of said central hub and said back and front flanges facilitating slight flexure of said tape winding ring to accommodate movements due to compressive thrusts on said tape ring.

8. The apparatus of claim 1 wherein said transverse web extends symmetrically on either side of said web to transmit compressive loading substantially symmetrically from said crossarms and shoulder to the mounting ring of said hub.

9. The apparatus of claim 1 including an interconnecting support rim carried about the circumference of said central annular hub, said annular support rim interconnecting said widened transverse web portions and said shoulder to distribute load circumferentially about said hub.

10. The apparatus of claim 9 wherein said interconnecting support rim is continuous about the circumference of said annular hub.

11. The apparatus of claim 1 wherein said lower abutting base surface of said front flange is continuous about said flange and including a plurality of circumferentially spaced cleats carried about said rim surface which abut said mounting ring.

12. A magnetic tape reel comprising:
 an annular central hub having an outer tape ring and an inner spindle mounting ring;
 a web extending between said tapering and mounting ring;
 a large-mass compression resisting body connecting said tape ring and said web;
 a web stem extending vertically between said spindle mounting ring and said large-mass compression resisting body;
 a front flange received on one side of said annular hub; an inwardly projecting ledge surface carried by said front flange connected to said compression resisting body of said central hub; a lower base carried by said front flange abutting said mounting ring;
 a back flange received on an opposing side of said central annular hub; an inwardly projecting ledge surface carried by said back flange connected to said compression resisting body; a second attachment surface carried by said back flange which projects inwardly and abuts said web; and
 said central annular hub being symmetrical about a plane normal to the axis of said tape reel whereby compressive forces are symmetrically transmitted through said hub.

13. The apparatus of claim 12 including a number of circumferentially spaced recesses formed in said web on opposing sides thereof; and
 said second attachment surface of said back flange including a number of inwardly projecting arms which are engaged in said circumferentially spaced recesses on one side of said web.

14. The apparatus of claim 13 wherein said inwardly projecting arms of said back flange include fingers which are reduced in cross section from said projecting arms, and said fingers are received in said recesses.

15. The apparatus of claim 14 wherein said lower inwardly projecting arms of said back flange include enlargement surfaces around said recessed penetrating fingers at the plane of finger reduction which abut an outside surface of said web.

16. The apparatus of claim 12 wherein said lower base surface of said front flange includes a number of circumferentially spaced cleats carried by said base surface which engage said mounting ring.

17. The apparatus of claim 12 wherein said large-mass compression resisting body includes an enlarged shoulder supported by said transversely widened web extensions; and
a crossarm carried by said shoulder which extends beyond said shoulder and engages said tape winding ring.

18. The apparatus of claim 17 wherein said large-mass compression resisting body includes a number of separated crossarms and shoulders circumferentially spaced around the circumference of said central hub and said inwardly projecting ledge surfaces of said front and back flanges are circumferentially spaced corresponding to the spacing of said crossarms and shoulders so that said shoulders are supported on said ledge surfaces.

19. The apparatus of claim 18 wherein said shoulders include vertical surfaces and said ledge surfaces of said front and back flanges include vertical surfaces which engage said vertical shoulder surfaces; and
said ledge supporting surfaces include inclined surfaces which are inclined downwardly from said vertical ledge surface creating a junction where said shoulder is supported.

20. The apparatus of claim 12 including a interconnecting support rim carried around a circumference of said central annular hub interconnecting said compression resisting body and said web, said interconnecting support rim being continuous to circumferentially distribute the compressive loading on said central annular hub.

21. The apparatus of claim 12 wherein said front flange includes an intermediate slotted rim surface for spacing said front flange relative to said central annular hub, said intermediate slotted rim surface being between said ledge supporting surface and said lower base surface.

22. The apparatus of claim 12 wherein said second attachment surface of said back flange includes a number of slotted arms which project inwardly and straddle said transversely widened web stem.

23. The apparatus of claim 22 including a lockout ring formed between said lower arm abutting surface of said back flange, said widened web stem of said annular hub, and said spindle mounting ring.

24. The appartus of claim 12 wherein said symmetrical annular hub includes as a mirror image about said plane normal to its central axis:
a straight wall extending up from said mounting ring, a lower recess forming wall extending inwardly from said straight wall, a rear recess forming wall extending upwardly from said lower recess forming wall;
an upper recess forming wall extending from said rear recess forming wall extending outwardly to form a bottom surface of said interconnecting rim;
a generally vertical rim surface extending up from said bottom surface of said interconnecting rim;
an upwardly slanting rim surface forming a top surface of said interconnecting rim terminating in a short vertical surface of said web which terminates at said tape winding ring.

25. The apparatus of claim 12 wherein said web stem includes transversely widened web portions projecting laterally beyond said web transversely thereto on both sides of said web in a symmetrical manner to transmit compressive loading from said compression absorbing body generally symmetrically through said central hub.

26. The apparatus of claim 20 wherein said large-mass compression resisting body includes a horizontal surface extending outwardly from said interconnecting rim, a vertical shoulder surface resting on said ledge supporting surfaces of said back and front flanges, and an outwardly extending arm surface which terminates at a bottom surface of said tape winding ring, said compression resisting body being symmetrical about said plane of symmetry of said central annular hub.

27. A method of producing a tape reel on which magnetic tape and the like are wound having generally symmetrical compressive loading characteristics comprising:
providing a symmetrical central annular hub which is an exact mirror image of itself about a plane of symmetry which is normal to an axis of the reel which passes through the axial center of the reel;
providing a tape winding ring on said hub about which said magnetic tape is wound and a spindle mounting ring by which said hub is attached to a spindle;
providing a generally Y-shaped crossarm for supporting said tape ring and supporting said crossarm with a widened web stem portion which extends from said mounting ring so that compressive forces exerted on said tape ring are transmitted symmetrically from said tape ring to said mounting ring;
affixing a front flange to said central hub on one side thereof at two spaced surfaces;
affixing a back flange to an opposing side of said central hub and two spaced surfaces;
providing a lockout ring groove on the back flange of said flange;
whereby compressive forces exerted on said tape winding ring by winding of said tape is transmitted generally symmetrically between said tape mounting ring, Y-shaped crossarms, and said widened stem portions to the mounting ring of said hub.

28. The method of claim 27 including providing an enlarged shoulder supporting surface for carrying said Y-shaped crossarm and supporting said shoulder on opposing sides of said web stem against said back and front flanges by means of ledge surfaces inwardly projecting from said flanges.

29. The method of claim 27 including spacing said crossarms and web stem portions circumferentially around the circumference of said annular hub so that contact of said flanges and central hub is intermittently spaced at intervals around the circumference of said annular hub.

30. The method of claim 27 including forming one of said support surfaces of said front flange to include a slotted surface, slots of which straddle said web stem portions on one side to align said front flange with said annular hub.

31. The method of claim 27 including providing a continuous interconnecting rim surface around a circumference of said annular hub which interconnects said crossarms and web stem portions so that compressive forces are transmitted circumferentially about said annular hub.

32. A tape reel for magnetic tape and the like comprising:

a central hub having a tape winding ring upon which said tape is wound and a spindle mounting ring adapted for fitting with a spindle drive of an associated machine;

said central hub including at circumferentially spaced sections around the circumference of said central hub a generally Y-shaped section extending between said tape mounting ring and said spindle mounting ring to support said tape winding ring against compressive forces as said tape is wound upon said tape winding ring;

a web extending between adjacent ones of said Y-shaped sections generally normal to said section to interconnect said sections;

a widened stem portion included in said Y-shaped section extending transversely past said web on opposing sides thereof, said stem portions being connected to said spindle mounting ring;

a large-mass compression-resisting body carried by said widened stem portion of said Y-shaped section connected to and supporting said tape winding ring, said compression resisting body being widened relative to said stem portion and extending on opposing sides of said stem portion to support said tape winding ring;

a back reel flange attached to one side of said central hub;

a front reel flange attached to an opposing side of said central hub; and said Y-shaped section of said central hub being symmetrical about a plane normal to the reel axis passing through the axial center of said tape reel so that compressive forces transmitted during the winding of tape on said tape winding ring are distributed generally symmetrically on either side of said plane through said central hub.

33. The apparatus of claim 32 including a continuous interconnecting support rim included in said central hub between said stem portion and said large-mass compression-resisting body and interconnecting adjacent ones of said Y-shaped sections to facilitate distribution of compressive forces circumferentially in said hub.

34. The apparatus of claim 32 wherein said compression-resisting body includes a crossarm extending across said stem portion carrying said tape winding ring and a shoulder portion carried across said stem portion carrying said crossarm.

35. The apparatus of claim 34 including ledge supporting surfaces carried by said back and front flanges attached to said shoulder portion.

36. The apparatus of claim 35 including flexure spaces formed between said ledge supporting surface and said crossarm spacing said tape winding ring sufficiently from said ledge supporting surface to facilitate movement of said tape ring under compression without movement of said flanges through said ledge supporting surface.

37. A tape reel for magnetic tape and the like comprising:

a central hub having a tape winding ring upon which said tape is wound and a spindle mounting ring adapted for fitting with a spindle drive of an associated machine;

said central hub having a mirror image symmetrically about a place normal to a reel axis which passes through the axial center of said reel;

a crossarm carrying said tape winding ring extending underneath and across a substantial width of said tape winding ring;

a reduced web section extending generally normal to said crossarm and interconnecting said crossarm and spindle mounting ring, said web section being reduced in width relative to said crossarm;

a lower shoulder portion included in said crossarm extending transversely past said web section on opposing sides thereof;

said crossarm, shoulder portion, and web section of said central annular hub being symmetrical about said normal plane;

a back reel flange attached to one side of said central hub having an attachment at one side of said shoulder portion; and a front reel flange attached to an opposing side of said central hub having attachment at an opposing side of said shoulder portion.

38. The reel of claim 37 wherein said crossarm, shoulder portion, and web section have a Y-shaped cross-section so that compressive forces transmitted during the winding of tape on said tape winding ring are distributed generally symmetrically on either side of said plane through said central hub.

39. The reel of claim 37 wherein recess spaces formed inwardly in said web section, at least one of said front or back flanges having attachment within said recess spaces.

* * * * *